(12) United States Patent
Engholm et al.

(10) Patent No.: US 8,659,804 B2
(45) Date of Patent: Feb. 25, 2014

(54) OPTICAL SCANNING

(75) Inventors: Nis Engholm, Fredensborg (DK); Anders Ørbæk, Glostrup (DK)

(73) Assignee: Contex A/S, Allerod (DK)

( * ) Notice: Subject to any disclaimer, the term of this patent is extended or adjusted under 35 U.S.C. 154(b) by 119 days.

(21) Appl. No.: 13/130,855

(22) PCT Filed: Nov. 26, 2008

(86) PCT No.: PCT/EP2008/066238
§ 371 (c)(1),
(2), (4) Date: Aug. 15, 2011

(87) PCT Pub. No.: WO2010/060474
PCT Pub. Date: Jun. 3, 2010

(65) Prior Publication Data
US 2011/0299137 A1  Dec. 8, 2011

(51) Int. Cl.
*H04N 1/04* (2006.01)
(52) U.S. Cl.
USPC ............................ 358/474; 358/497; 358/486
(58) Field of Classification Search
USPC ......... 358/474, 486, 497, 496, 501, 475, 509, 358/506, 406, 412, 505
See application file for complete search history.

(56) References Cited

U.S. PATENT DOCUMENTS

| | | | | |
|---|---|---|---|---|
| 4,864,415 A | * | 9/1989 | Beikirch et al. | 358/474 |
| 5,048,106 A | * | 9/1991 | Nakajima et al. | 382/298 |
| 5,144,455 A | | 9/1992 | Stein et al. | |
| 5,854,960 A | * | 12/1998 | Tagansky et al. | 399/239 |
| 6,229,629 B1 | * | 5/2001 | Tsai | 358/486 |
| 6,297,491 B1 | * | 10/2001 | Mangerson | 250/208.1 |
| 6,373,599 B1 | * | 4/2002 | Yamamoto et al. | 358/474 |
| 6,459,507 B1 | * | 10/2002 | Wang et al. | 358/474 |
| 6,470,099 B1 | | 10/2002 | Dowdy et al. | |
| 6,624,894 B2 | * | 9/2003 | Olszak et al. | 356/511 |
| 6,972,877 B1 | * | 12/2005 | Nakamura | 358/474 |
| 7,605,953 B2 | * | 10/2009 | Crooker et al. | 358/474 |
| 7,764,636 B2 | * | 7/2010 | Tsunasawa et al. | 370/312 |
| 7,995,254 B2 | * | 8/2011 | Edwards et al. | 358/497 |

(Continued)

FOREIGN PATENT DOCUMENTS

| | | |
|---|---|---|
| JP | 3-023771 A | 1/1991 |
| JP | 2000-151908 A | 5/2000 |
| JP | 2004-172861 A | 6/2004 |

OTHER PUBLICATIONS

International Search Report for corresponding International Patent Application No. PCT/EP2008/066238 mailed May 26, 2009.

(Continued)

*Primary Examiner* — Negussie Worku
(74) *Attorney, Agent, or Firm* — Merchant & Gould P.C.

(57) ABSTRACT

Disclosed is a method of adjusting a scanner for scanning of an original, the scanner comprising an image sensor and a light source for emitting light, the method comprising the steps of: a) moving the image sensor in order for it to be located at a predefined scanning position by means of a movable mechanical member; b) determining the difference between the scanning position and the predefined scanning position; where the method further comprises: determining the difference between the scanning position and the predefined scanning position by detecting radiation from at least one fix-point having a fixed position relative to the image sensor.

12 Claims, 4 Drawing Sheets

(56) References Cited

U.S. PATENT DOCUMENTS

| | | | |
|---|---|---|---|
| 8,357,268 B2 * | 1/2013 | Pietzner et al. | 204/224 M |
| 8,482,809 B2 * | 7/2013 | Mikami | 358/406 |
| 8,503,047 B2 * | 8/2013 | Shirado | 358/475 |
| 8,503,050 B2 * | 8/2013 | Morikawa | 358/505 |
| 2004/0150730 A1 | 8/2004 | Satake et al. | |
| 2005/0073728 A1 | 4/2005 | Sakaguchi et al. | |

OTHER PUBLICATIONS

The International Preliminary Report on Patentability for corresponding International Patent Application PCT/EP2008/066238 mailed Mar. 14, 2011.

Japanese Office Action for corresponding Japanese Patent Application No. 2011-537854 mailed Jul. 9, 2013.

* cited by examiner

OPTICAL SCANNING

This application is a National Stage Application of PCT/EP2008/066238, filed 26 Nov. 2008, and which application is incorporated herein by reference. To the extent appropriate, a claim of priority is made to each of the above disclosed applications.

FIELD OF THE INVENTION

This invention generally relates to optical scanning. More particularly, the invention relates to a method of adjusting a scanner for scanning of an original.

BACKGROUND OF THE INVENTION

U.S. Pat. No. 6,470,099 discloses a method where a document to be scanned is corner referenced on a transparent platen, with the document's image facing down. The platen defines an X-Y coordinate system. A moving line of light extends in the X direction and illuminates the document's image, line by line, as the line of light moves in the image, line by line, as the line of light moves in the Y direction. The line of light that is thus reflected from the document is sensed by a linear CCD array having a large number of individual sensor cells arranged in a line that extends in the X direction and coincides with the line of light. Multiple reference marks embodied in one or more reflection targets are located at a known position relative to the platen and/or its document referencing corner, to be scanned prior to scanning the document. Sensing of the reference marks enables that the X direction physical position of the CCD sensor array relative to the referencing corner to be accurately determined, and the platen's orientation with respect to the CCD array and line of light. A determination of the platen's orientation can include a determination of the platen's skew with respect to the CCD array and line of light, as well as a determination of the platen's orthogonality with respect to the direction of travel of a carriage which supports the CCD array and line of light.

US 2005/0073728 discloses a CCD array image sensor fixed on a Y-direction stage that is supported on an X-direction stage. When a piezo driver supplies voltage to an X-direction piezo element and a Y-direction piezo element, the CCD image sensor is moved in X and Y directions. The X-direction position sensor and the Y direction position sensor detect the position information of the CCD image sensor in X and Y directions, respectively, and send the position information to the piezo driver. The piezo driver sets a target movement of the CCD image sensor and detects the actual movement of the CCD image sensor from the position information. The piezo driver adjusts the output voltage to the X-direction piezo element and the Y-direction piezo element such that the target movement becomes the same as the actual movement. Thus all scan positions are predetermined and fixed relative to the scanner, and these scan positions are the same each time a new image is scanned.

It remains a problem to provide a method where the movement of an image sensor adjusted by a control system is improved, when the control system is subject to be affected by temperature, humidity, atmospheric pressure, light, etc.

SUMMARY

Disclosed is a method of adjusting a scanner for scanning of an original, the scanner comprising an image sensor and a light source for emitting light, the method comprising the steps of:

a) moving the image sensor in order for it to be located at a predefined scanning position by means of a movable mechanical member;
b) determining the difference between the scanning position and the predefined scanning position;

where the method further comprises:

determining the difference between the scanning position and the predefined scanning position by detecting radiation from at least one fix-point having a fixed position relative to the image sensor.

Consequently, it is an advantage that the position of the image sensor in an optical scanner can be continually adjusted, when the movement system of the scanner is affected by temperature, light, humidity, atmospheric pressure, etc. The position of the image sensor can be determined and is configured to be adjusted for each scanning position depending on the difference between the predefined scanning position and the actual scanning position.

Thus it may be difficult or even impossible to position the image sensor correct while scanning, but it is an advantage of the present method that continuous adjustment of the image sensor position is possible, because a fix-point is used to adjust the movement and position of the image sensor for the scanning of each image portion or strip. Thus, it is an advantage that the image sensor is self-adjusting and that the movement of the image sensor is adaptive, since the image sensor adaptively determines its position.

Furthermore it is an advantage that the same unit may be used both for scanning and adjusting. This is the case if the image sensor, apart from detecting the incident light reflected from the original, also detects the signal from the fix-point.

It is an advantage that the fix-point functions as a reference point for estimating the position of the image sensor.

Furthermore, it is an advantage that, in the scanning process each image portion or strip of the original is scanned, and the movement and positioning of the image sensor are an iterative process. The original is scanned by scanning the number of image portions or strips that the original can be divided into, and then, when all the image portions or strips have been scanned, the digital image of the original is complete.

The predefined scanning position may be determined by means of the preceding scanning position.

It is an advantage that, when the position of the image sensor is not correct relative to a desired position, it is possible to calculate the difference or distance from the desired position and compensate the movement of the image sensor relative to this. Thus, the image which the image sensor is making under such conditions, is a correct image, but the position from which the image is seen is not the desired position, and the present method provides a solution for solving this.

Furthermore, it is an advantage that when performing measurement, adjustment and compensation in accordance with the present method, it is possible to use inexpensive materials in the scanner while still obtaining precise and accurate measurement.

It is an advantage of the present method that the scanner may run and drive constantly while performing adjustment, both when scanning an original and when an original is not scanned. Before scanning an original, the scanner is performing a rough, preliminary adjustment, and when an original is scanned, the actual scanning and the adjustment are performed simultaneously or alternately.

Furthermore, in some embodiments according to the present method, it is an advantage that the resolution of the digital image of the original is enhanced.

In some embodiments the method further comprises:
scanning an original for converting it to a digital image by detecting light incident on an image sensor, the light being emitted from a light source and reflected from the original; the image sensor comprising a plurality of optical sensors.

In some embodiments the method further comprises:
c) scanning a portion of the original at the scanning position and storing a digital image of said portion of the original.

In some embodiments the method further comprises:
repeating step a)-c) until the scanning of the original is completed.

In some embodiments the method further comprises:
when scanning of the original is completed, the digital image of the original is comprised of a plurality of digital images of the scanned portions of the original.

An advantage of this embodiment is that, by combining or stitching all the scanned image portions or strips of the original, the resulting digital image of the original may be an image with a high resolution, since the center of each image portion or strip may be used where the resolution is highest.

In some embodiments the at least one fix-point is arranged on a glass pane on which the original is placed for being scanned.

An advantage of this embodiment is that, by placing or arranging the fix-point on the glass pane of the scanner, the fix-point has a fixed position relative to other parts or units of the scanner, whereby determining and adjusting positions are possible. Thus the fix-point is a reference point in the scanner by means of which the positioning of the image sensor can be performed.

In some embodiments the at least one fix-point is selected from the group comprising:
  a stitching wire;
  a metallic member;
  a spot of radiation;
  a light spot;
  an infrared mark;
  a pattern;
  a groove.

In some embodiments the radiation from the at least one fix-point is reflected radiation.

In some embodiments the radiation is electromagnetic radiation.

In some embodiments the radiation is light.

In some embodiments the radiation is visible light.

In some embodiments detecting radiation from the at least one fix-point is performed by receiving the radiation in at least one redundant optical sensor, where a redundant optical sensor is defined as not being used for creating a digital image of the original.

An advantage of this embodiment is that a redundant optical sensor is used for detecting the fix-point, since then the detection of the fix-point does not influence the scanning and imaging of the original, since it not the same optical sensors which are used for the scanning and the fix-point detecting, i.e. the adjustment of the movement of the image sensor.

In some embodiments the at least one redundant optical sensor is arranged in a device selected from the group comprising:
  the image sensor;
  a second sensor.

An advantage of this embodiment is that the redundant optical sensor can be arranged in the image sensor or in a different, second sensor, depending on whether there is space enough for a redundant optical sensor in the image sensor or depending on whether the fix-point radiation is a light which the image sensor can detect.

In some embodiments the second sensor is attached to a device selected from the group comprising:
  the movable mechanical member;
  the image sensor.

An advantage of this embodiment is that the second sensor, where the redundant optical sensor can be arranged, can be attached to the movable mechanical member which moves the image sensor or can be attached to the image sensor itself.

In some embodiments one or more of the image sensor, the second sensor and the movable mechanical member are immovably attached to each other. An advantage of this embodiment is that, if there is a second sensor, the second sensor, the image sensor and the movable mechanical member may all be attached to each other so that they cannot move relative to each other, since this would complicate the calculation of the movement of the image sensor.

In some embodiments the second sensor is selected from the group comprising:
  an image sensor;
  an infrared (IR) sensor;
  a far infrared (FIR) sensor.

An advantage of this embodiment is that the second sensor may be able to detect different kinds of radiation, such a light, visible light, infrared radiation, far infrared radiation, etc., and thus the fix-point may emit different kinds of radiation. However, the image sensor may also be able to detect e.g. infrared, far infrared radiation etc.

In some embodiments the predefined scanning position is determined by identifying the position of the image sensor relative to the at least one fix-point, where scanning of a portion of the original would provide a digital image of said portion of the original with the highest possible resolution.

An advantage of this embodiment is that the resolution of the image portion is enhanced.

In some embodiments the movable mechanical member is moved by use of a means selected from the group comprising:
  voltage means;
  actuator;
  piezoelectric motor;
  resonance circuit;
  vibration motor;
  magnetic means;
  solenoid.

An advantage of this embodiment is that the movable mechanical member can be moved by different means and that the movement by these means can be accurate and precise.

In some embodiments determining the difference between the scanning position and the predefined scanning position performed is performed by means of optical feedback.

An advantage of this embodiment is that optical feedback can be performed fast, accurately and with inexpensive materials.

In some embodiments determining the difference between the scanning position and the predefined scanning position comprises comparing coordinates of the scanning position with coordinates of the predefined scanning position.

In some embodiments iteration is performed if the difference is not less than a predefined threshold value.

An advantage of this embodiment is that if the scanning position and the predefined scanning position are not equal within an acceptable error, i.e. if the difference between the positions is not less than a predefined threshold value, the positions are defined to be not equal, and a calculation is performed in order to compensate for the difference and to calculate the next scanning position by taking the error into account. Thus iteration is performed.

In some embodiments the iteration comprises a compensation calculation.

An advantage of this embodiment is that, when performing a compensation calculation, the difference is taken into account when calculating the position of the next scanning, whereby the movement of the image sensor is optimised.

In some embodiments the method further comprises:
performing the compensation calculation based on the determined difference between a first scanning position and a first predefined scanning position to determine a second predefined scanning position;
adjusting the movement of the image sensor in order for it to be located at the second predefined scanning position.

In some embodiments the image sensor is selected from the group comprising:
a linear array of optical sensors;
a number of optical sensors arranged displaced in relation to each other;
a CCD image sensor;
a CMOS image sensor;
a CIS image sensor;

In some embodiments the scanner is chosen from the group comprising:
large format scanner;
a roller scanner;
flat bed scanner.

In some embodiments the method further comprises:
repeating step a)-b) until the difference between the scanning position and the predefined scanning position is less than a predefined value.

In some embodiments optical scanning of an original is adapted to be started when the difference between the scanning position and the predefined scanning position is less than a predefined value.

The two above embodiments relate to adjusting of the scanner prior to scanning of an original. Prior to scanning of an original, the scanner adjusts the position of the image sensor, so that the image sensor is positioned at a distance which is defined as being close enough for the scanning of the original to be performed. As long as the difference or distance between the position of the image sensor and a first predefined scanning position is too big or larger than a predefined value, the scanning of the original will not be initiated, and the adjusting of the image sensor will just continue without storing any images. But as soon as the distance between the position of the image sensor and the first predefined scanning position is less than the predefined value then the actual image scanning is started, and images are stored.

An advantage of this embodiment is that the image scanning and storing of images are only performed when the difference or distance between the scanning position of the image sensor and the predefined scanning position is small enough, because this may save time when scanning and may save storage, because only the images which are being used for the resulting image may be saved. The quality of the scanned images may be better when imaging is performed only when the position of the image sensor is within a predefined value of the predefined scanning position.

In some embodiments the method further comprises:
performing a compensation calculation based on the determined difference between a first scanning position and a first predefined scanning position to determine a second predefined scanning position;
adjusting the movement of the image sensor in order for it to be located at the second predefined scanning position.

The present invention relates to different aspects including the method described above and in the following, and corresponding devices, uses, and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a scanner for scanning of an original, the scanner comprising:
an image sensor;
a light source for emitting light;
a movable mechanical member for moving the image sensor in order for it to be located at a predefined scanning position;
means for determining the difference between the scanning position and the predefined scanning position; and
means for detecting radiation from at least one fix-point having a fixed position relative to the image sensor for determining the difference between the scanning position and the predefined scanning position.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1A:
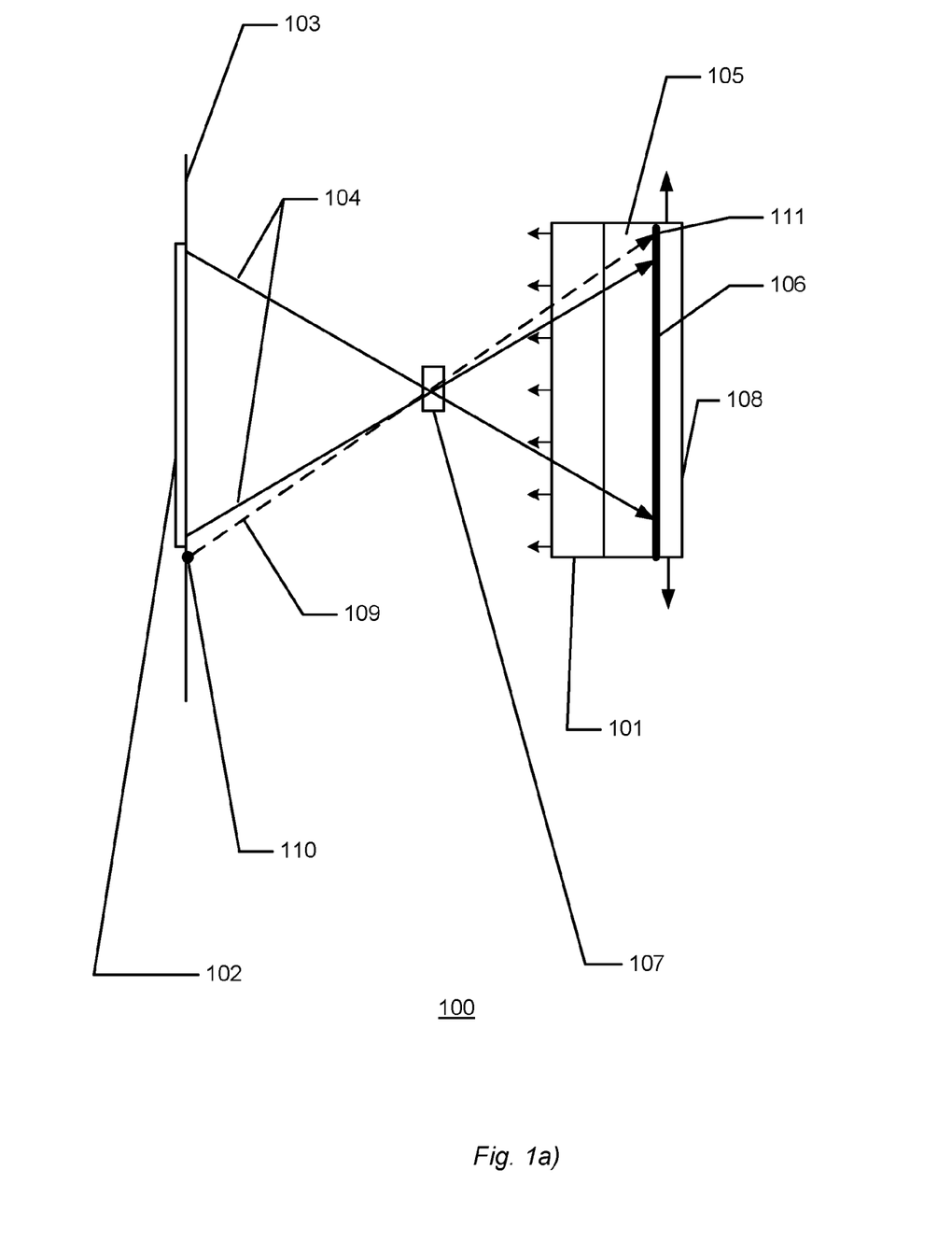
FIG. 1 shows examples of an arrangement of a scanner.

FIG. 1a) shows an example of an arrangement of a scanner. The scanner 100 comprises a light source 101 for illuminating an original 102 such as a document. The original 102 is placed on a glass pane or platen 103 for being scanned. Light from the light source 101 which hits the original 102 is reflected as reflected light 104. An image sensor 105 comprising a plurality of optical sensors 106 detects the reflected light 104 incident on it from the original 102, and the reflected, incident light 104 is converted to a digital image of the original. The reflected light 104 is passed through an optical element 107 such as a lens.

The image sensor 105 is attached to a movable mechanical member 108 which is configured to move in one or more directions in order to position the image sensor 105 in a predefined, precalculated or desired position relative to the glass pane 103 and/or a fix-point 110.

The movable mechanical member can be moved by means of a voltage difference, an actuator, a piezoelectric motor, a resonance circuit, a vibration motor, magnetic means, a solenoid and/or the like.

For creating a complete digital image of the entire original, the image sensor scans the original by scanning one portion of the original at a time and stores the image of each portion, and when the whole original has been scanned, the resulting digital image of the original is made up of the single images of each portion of the original. Each digital image of each portion of the original may be stored in a processing unit and/or the like.

For each portion of the original which the image sensor shall scan, the image sensor must move in order to be positioned correctly in relation to the respective portions of the original. Because scanning is sensitive to temperature, light, humidity, atmospheric pressure etc., the image sensor and the scanner may be affected by the mentioned parameters, but these effects can be taken into account by measuring at what position the image sensor actually scans a portion and then comparing this actual position with the position which is the predefined or desired position. The desired or predefined scanning position can be determined by identifying the position of the image sensor relative to the fix-point 110 in the scanner, where scanning of a portion of the original would provide a digital image of that portion of the original with the highest possible resolution.

When comparing the actual position i.e. the scanning position, and the desired or predefined scanning position, a difference or distance between these two positions can be found e.g. by comparing the (x,y) coordinates, i.e. the coordinate position in two directions, of the scanning position with coordinates of the predefined scanning position.

If e.g. this difference is not less than a predefined threshold value, iteration can be performed. Iteration may be performed by means of an integrator, which is a device configured to perform the mathematical operation integration. Alternatively and/or additionally, iteration may be performed by means of a servomechanism, servo drive or servo, which is an automatic device configured to use error-sensing feedback to correct the performance of a mechanism. The feedback or error-correction signals can help control mechanical position. A servomechanism can provide position control and may operate on the principle of negative feedback, where the control input is compared to the actual position of the mechanical system as measured by some sort of transducer at the output. Any difference between the actual and the wanted values (an "error signal") may be amplified and used to drive the system in the direction necessary to reduce or eliminate the error. A servo drive can produce motion proportional to a command signal. The command signal may represent a desired velocity, and a velocity sensor attached to the servo motor may report the motor's actual velocity back to the servo drive. The servo drive then compares the actual motor velocity with the commanded motor velocity, and it may then alter the voltage frequency to the motor so as to correct for any error in the velocity. Thus a servomechanism, servo or servo drive can monitor feedback signals and continually adjust for deviation from expected movement and ensure the accuracy of the commanded movement. Alternatively and/or additionally, the iteration may for example be Newton's method, which is a method of finding successively better approximations. The iteration can comprise a compensation calculation, where the compensation calculation is e.g. performed by being based on the determined difference between a first scanning position and a first predetermined scanning position, in order to determine a second predetermined scanning position. The movement of the image sensor is then adjusted in order for locating or positioning the image sensor at the second predefined scanning position.

This process is then repeated for e.g. a third, fourth, fifth, sixth etc. position, i.e. for all the portions of the original, until the entire original has been scanned and the resulting digital image is complete.

The desired position of the image sensor 105 is determined based on optical feedback. The optical feedback is performed by detecting reflected light 109 from the fix-point 110. The fix-point 110 is arranged on the glass pane 103, and the fix-point 110 may be e.g. a stitching wire, a metallic member, a spot of radiation, a light spot, an infrared mark, a pattern, a groove and/or the like. A redundant optical sensor 111 detects the reflected light 109 from the fix-point 110. The redundant optical sensor is not used for creating the digital image of the original. In FIG. 1a) the redundant optical sensor 111 is arranged in the image sensor 105 together with the plurality of optical sensors 106. There may be one or more redundant sensors used for scanning the fix-point.

This arrangement where the image sensor 105 comprises both the plurality of optical sensors 106 for detecting the reflected light 104 from the original 102 for creating the digital image of the original 102 and the redundant optical sensor 111 for performing the optical feedback may be used when there is a surplus, excess, residue and/or surfeit of optical sensors in the image sensor, where this/these optical sensor(s) is/are not used for creating the digital image of the original. This may be the case if there is e.g. more than one image sensor in the scanner, and if these two or more image sensors are e.g. displaced relative to each other, whereby there may be an overlap between e.g. two optical sensors, which cover the same area.

Figure 1B:
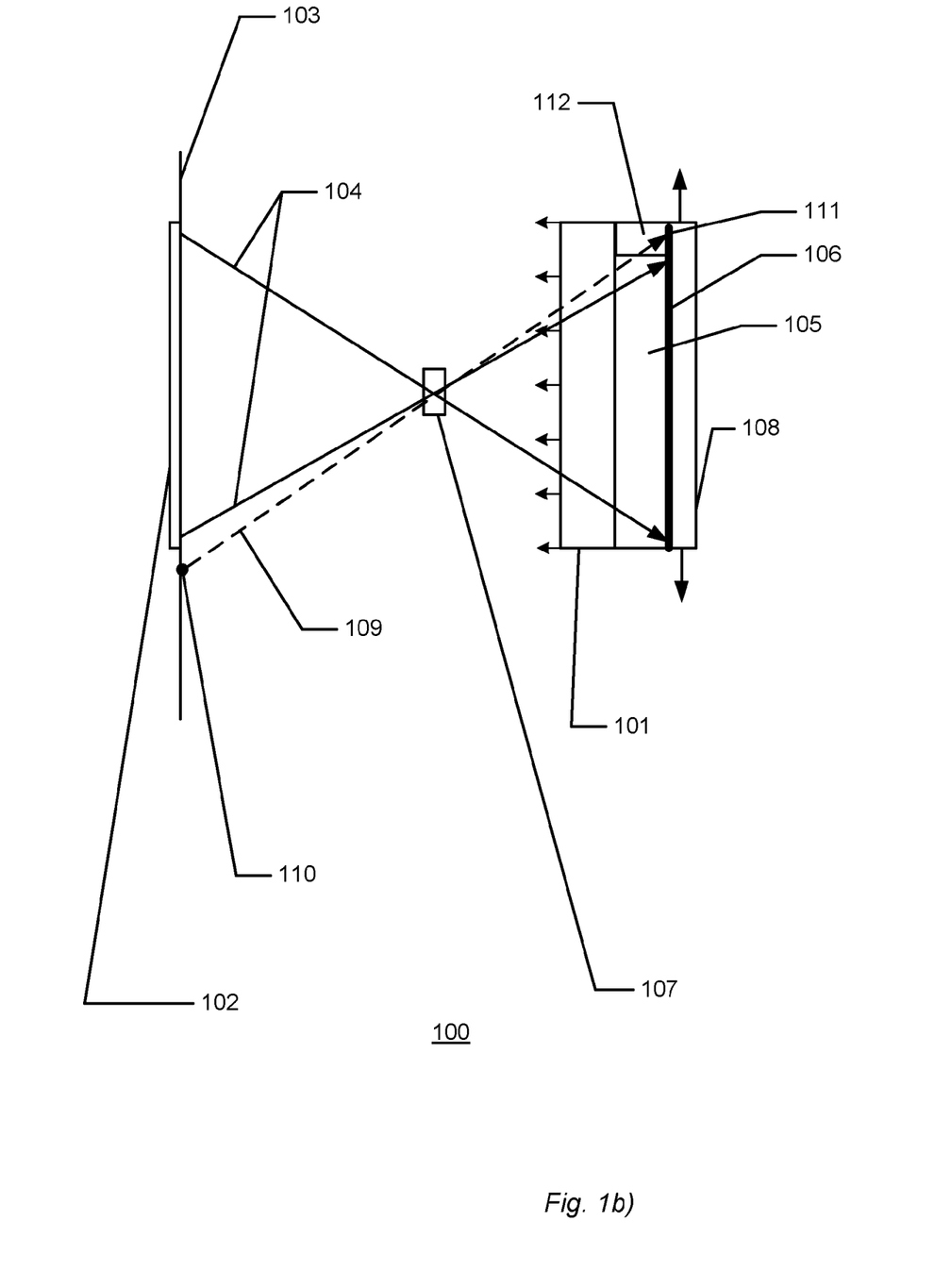

FIG. 1b) is similar to FIG. 1a), but with the difference that the redundant optical sensor 111 is arranged in a second sensor 112 instead of in the image sensor 105.

This arrangement where the image sensor 105 comprises only the plurality of optical sensors 106 for detecting the reflected light 104 from the original 102 for creating the digital image of the original 102 and where a second sensor 112 comprises the redundant optical sensor 111 for performing the optical feedback, may be used when the entire image sensor 105, i.e. all the optical sensors 106, is used for making the digital image of the original and thereby there is not a surplus, excess, residue and/or surfeit of optical sensors in the image sensor to be used for the optical feedback. This may be the case if the optical sensors 106 in the image sensor 105 are arranged in e.g. a linear array, where there is no surplus optical sensors, such as if the resolution of a print is e.g. 600 dpi, and this corresponds to the image sensor being configured to scan a document size of for instance exactly A4 or A3.

As an example it is possible to use visual light for creating the digital image of the original, and then the second sensor 112 can be e.g. an infrared (IR) sensor which detects infrared light from the fix-point 110. Thus the second sensor 112 may in this example be able to detect infrared light, and the image sensor may not detect the infrared light from the fix-point. Alternatively and/or additionally, the image sensor may be able to detect infrared, far infrared light etc. Alternatively and/or additionally the second sensor can be an optical image sensor which can detect visual light like the image sensor 105 or the second sensor can be a far infrared (FIR) sensor, which can detect infrared radiation of long wave length.

The image sensor 105 can be a linear array of optical sensors, a number of optical sensors arranged to be displaced in relation to each other, a CCD image sensor, a CMOS image sensor, a CIS image sensor and/or the like.

The scanner can be a large format scanner, a roller scanner, a flat bed scanner and/or the like.

The movable mechanical member 108 is configured to move in one or more direction(s), and the movement or motion may be in the range of about 2 micrometers. However, it is understood that the movement of the mechanical member 108 may be smaller or larger than this.

The movable mechanical member 108 moves the image sensor 105 in order to scan the original 102 at different positions, whereby different portions or intervals of pixels are detected. When pixels from different portions of the original are detected and/or stored, the resolution of the digital image of the original is increased.

Figure 2:
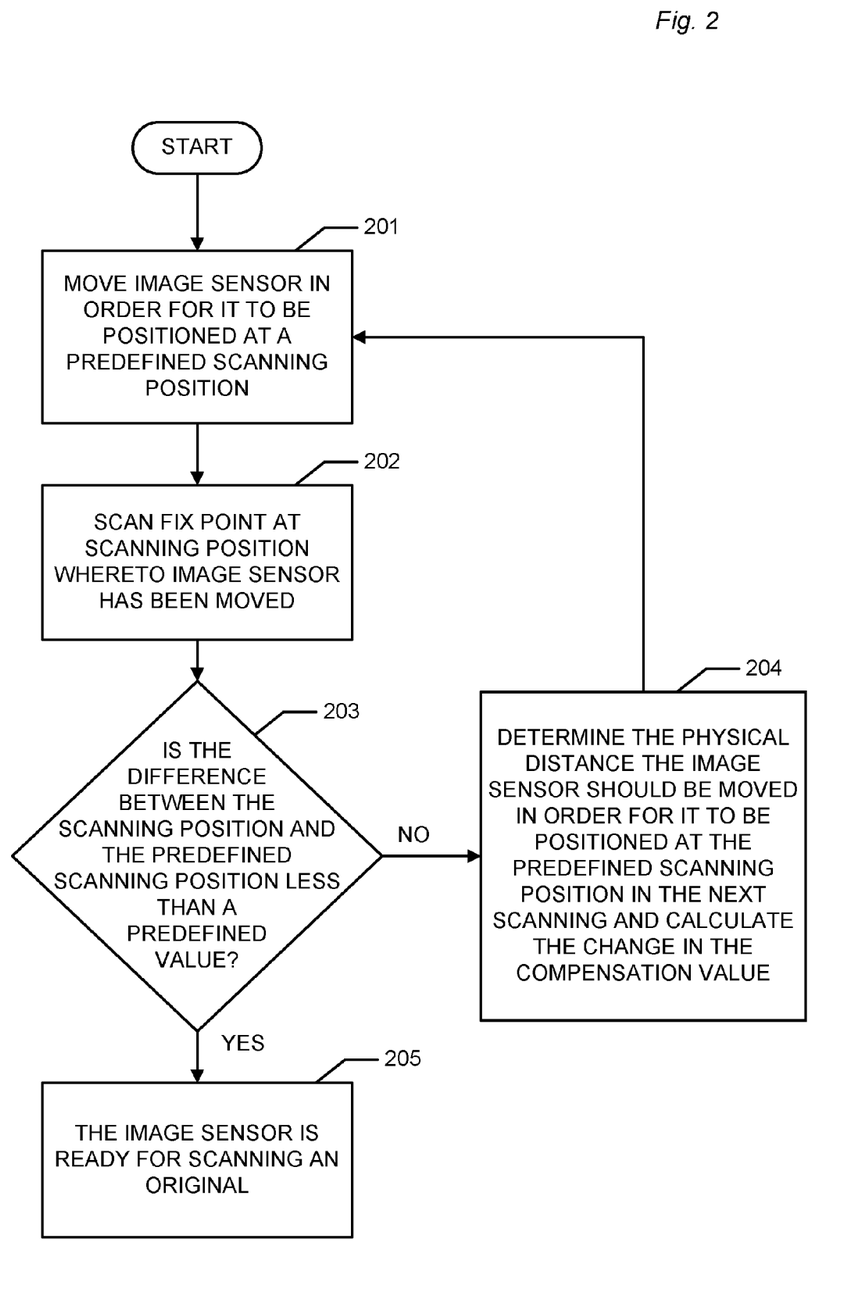
FIG. 2 is a flowchart showing the process prior to scanning.

FIG. 2 is a flowchart showing the adjustment process of the position of the image sensor prior to scanning of an original.

Initially a coarse and rough adjustment is performed of the scanner and of the image sensor position, before an original is placed in the scanner for being scanned.

In step 201 the image sensor is moved in order to be positioned at a predefined scanning position. The predefined scanning position may be determined based on the preceding scanning position.

In step 202 the fix-point in the scanner, e.g. on the glass pane in the scanner, is scanned at the scanning position, the image sensor has moved to. The fix-point may be scanned using the image sensor or a second sensor.

In step 203 it is determined whether the difference or distance between the actual scanning position and predefined scanning position is less than a predefined value or distance.

In step 204 the physical distance which the image sensor should move in order to be positioned at the predefined scanning position in the next scanning position is determined when the difference between the actual scanning position and predefined scanning position is not less than a predefined value or distance, and the change in the compensation value in order to hit the next predefined scanning position is calculated.

In step 205 the image sensor is defined to be ready for performing the actual scanning on an original, when the difference between the actual scanning position and predefined scanning position is less than a predefined value or distance.

Thus the initial, preliminary, rough adjustment is performed by means of the redundant optical sensor receiving a signal, e.g. of visual light, infrared light etc. from the fix-point e.g. arranged on the glass pane in the scanner. Thereby optical feedback is obtained, and by means of this optical feedback the image sensor is adjusted roughly. When the rough, preliminary adjustment is acceptable within a threshold value, the scanner is ready for the actual scanning of an original.

Figure 3:
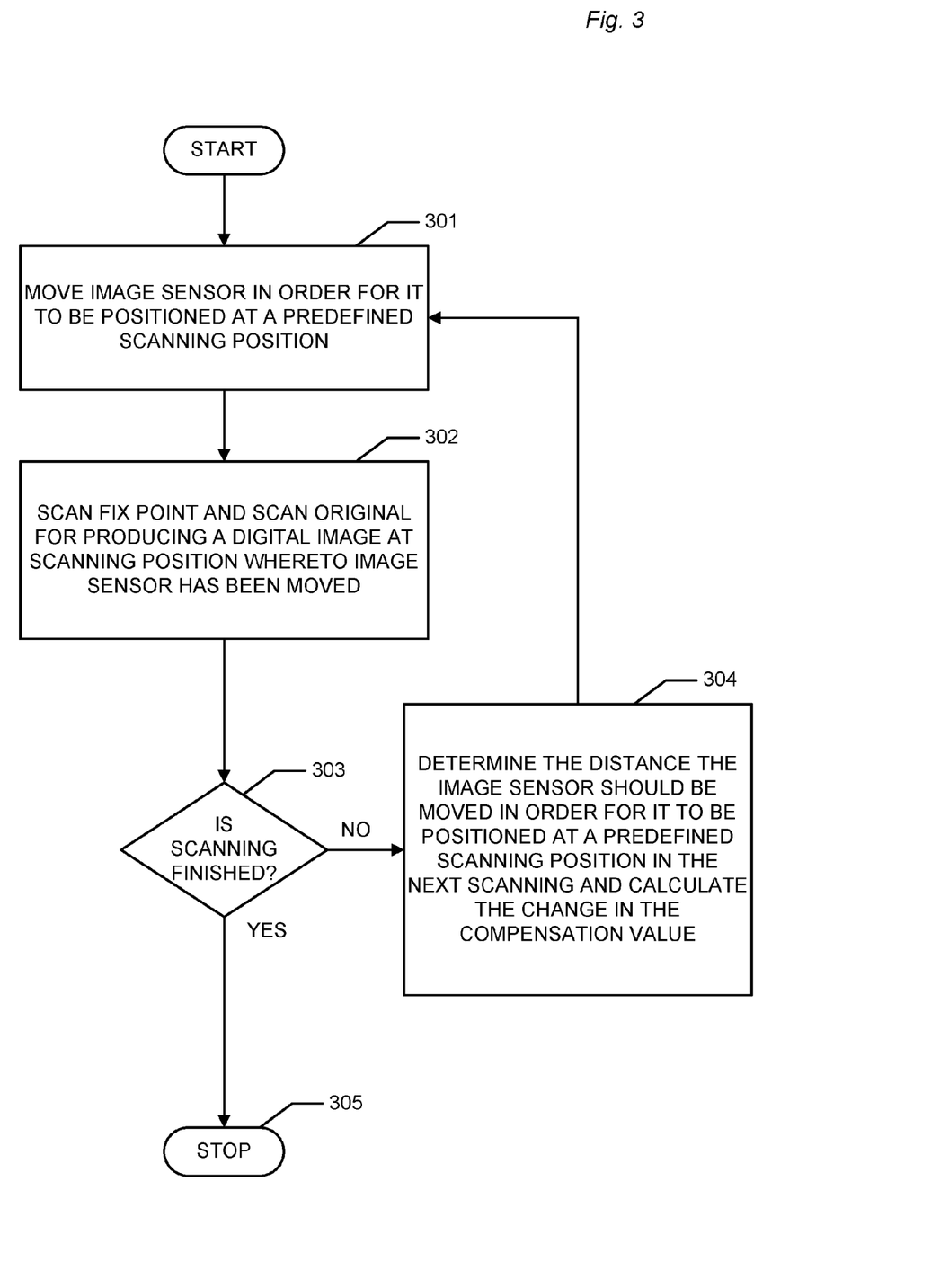
FIG. 3 is a flowchart showing the process during scanning.

FIG. 3 is a flowchart showing the process during scanning.

In step 301 the image sensor is moved in order for it to be positioned at a predefined scanning position.

In step 302 the original and the fix-point are scanned at the scanning position the image sensor has been moved to. A portion of the original is scanned by means of the optical sensors in the image sensor and the fix-point is scanned by means of the redundant optical sensor.

In step 303 it is determined whether the scanning of the original is finished.

In step 304 the distance which the image should be moved in order for it to be positioned at the next predefined scanning position is determined, if the scanning of the original is not finished. The distance can be determined by calculating the compensation value. The process is then continued by repeating step 301 where the image sensor is moved, etc.

In step 305 the process is stopped, if the scanning of the original is finished.

Thus the image sensor scans the original portion by portion until the entire original has been scanned and digitally stored. When the first image portion or strip has been scanned, the image sensor moves to the next position and scans the next image portion or strip, and this continues until the entire original has been scanned.

For each position where an image portion or strip is scanned and stored, a fine adjustment or precision adjustment of the image sensor position and movement is also performed by means of optical feedback performed by means of the fix-point on the glass pane in the scanner plate and the redundant optical sensor in the image sensor or in a second sensor.

The image sensor should ideally scan each respective image portion or strip in certain respective positions. But due to temperature, humidity etc. the image sensor may not hit the correct position precisely or exactly. The fine adjustment or precision adjustment is therefore performed simultaneously with the scanning of each image portion, so that the actual position of the image sensor can be compared with the ideal position, the deviation between the actual and the ideal position is calculated and a compensation calculation is performed, so that the movement of the image sensor to the next scanning position is adjusted in accordance with the deviation.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of adjusting a scanner for scanning of an original, the scanner comprising an image sensor and a light source for emitting light, the method comprising the steps of:
    while scanning of the original:
    a) moving the image sensor from an actual scanning position in order for it to be located at a predefined scanning position by means of a movable mechanical member configured to allow the image sensor to detect different portions of pixels so that a resolution of a digital image of the original is increased;
    b) determining the difference between the actual scanning position and the predefined scanning position by detecting radiation from at least one fix-point and compensating the movement of the image sensor relative to this difference; and
    c) scanning a portion of the original at the actual and predefined scanning positions and storing a digital image of said portion of the original.

2. The method according to claim 1,
    wherein the digital image of the original is comprised of a plurality of digital images of the scanned portions of the original.

3. The method according to claim 1, wherein the at least one fix-point is arranged on a glass pane on which the original is placed for being scanned.

4. The method according to claim 1, wherein detecting radiation from the at least one fix-point is performed by receiving the radiation in at least one redundant optical sensor, wherein a redundant optical sensor is defined as not being used for creating a digital image of the original.

5. The method according to claim 4, wherein the at least one redundant optical sensor is arranged in a device selected from the group consisting of:
    the image sensor; and
    a second sensor.

6. The method according to claim 1, wherein determining the difference between the scanning position and the predefined scanning position is performed by means of an optical feedback.

7. The method according to claim 1, wherein iteration is performed if the difference is not less than a predefined threshold value.

8. The method according to claim 7, wherein the iteration comprises a compensation calculation.

9. The method according to claim 1, further comprising:
repeating steps b)-c) until the difference between the scanning position of the original and the predefined scanning position is less than a predefined value.

10. The method according to claim 1, wherein optical scanning of the original is adapted to be started when the difference between the scanning position of the original and the predefined scanning position is less than a predefined value.

11. The method according to claim 1, wherein the method further comprises:
performing a compensation calculation based on the determined difference between a first scanning position and a first predefined scanning position to determine a second predefined scanning position; and
adjusting the movement of the image sensor in order for it to be located at the second predefined scanning position.

12. A scanner for scanning of an original, the scanner comprising:
an image sensor;
a light source for emitting light;
a movable mechanical member for moving the image sensor;
means for determining a difference between a scanning position of the original and the predefined scanning position; and
means for detecting radiation from at least one fix-point having a fixed position relative to the image sensor for determining the difference between the scanning position and the predefined scanning position;
wherein the scanner while scanning of the original is configured to:
a) scan an original for converting it to a digital image by detecting light incident on an the image sensor, the light being emitted from a light source and reflected from the original; the image sensor comprising a plurality of optical sensors
b) move the image sensor from an actual scanning position in order for it to be located at the predefined scanning position by means of the movable mechanical member configured to allow the image sensor to detect different portions of pixels so that the resolution of the digital image of the original is increased;
c) determine the difference between the actual scanning position of the original and the predefined scanning position by detecting radiation from at least one fix-point and compensating the movement of the image sensor relative to this difference;
d) scan a portion of the original at the actual and predefined scanning positions and storing a digital image of said portions of the original.

* * * * *